(12) United States Patent
Wilhelmsson et al.

(10) Patent No.: US 11,076,351 B2
(45) Date of Patent: Jul. 27, 2021

(54) WAKE-UP SIGNAL CONSTRUCTION

(71) Applicant: Telefonaktiebolaget LM Ericsson (publ), Stockholm (SE)

(72) Inventors: Leif Wilhelmsson, Lund (SE); Miguel Lopez, Solna (SE); Thomas Olsson, Karlshamn (SE)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 0 days.

(21) Appl. No.: 16/470,207

(22) PCT Filed: Dec. 14, 2016

(86) PCT No.: PCT/EP2016/080997
§ 371 (c)(1),
(2) Date: Jun. 15, 2019

(87) PCT Pub. No.: WO2018/108265
PCT Pub. Date: Jun. 21, 2018

(65) Prior Publication Data
US 2019/0313337 A1 Oct. 10, 2019

(51) Int. Cl.
*H04W 52/02* (2009.01)
*H04L 5/00* (2006.01)

(52) U.S. Cl.
CPC ....... *H04W 52/0229* (2013.01); *H04L 5/0048* (2013.01); *Y02D 30/70* (2020.08)

(58) Field of Classification Search
CPC ............ H04W 52/0229; H04L 5/0048; Y02D 70/1242; Y02D 70/1262; Y02D 70/144; Y02D 70/00; Y02D 70/142
See application file for complete search history.

(56) References Cited

U.S. PATENT DOCUMENTS

| | | |
|---|---|---|
| 2005/0058102 A1 | 3/2005 | Santhoff et al. |
| 2005/0207383 A1 | 9/2005 | Carsello et al. |
| | (Continued) | |

FOREIGN PATENT DOCUMENTS

| | | |
|---|---|---|
| CN | 102042030 A | 5/2011 |
| EP | 1988655 A1 | 11/2008 |
| | (Continued) | |

OTHER PUBLICATIONS

IEEE: An Interference Robust Multi-Carrier Wake-up; Ruben de Francisco and Yan Zhang; 2011. (Year: 2011).*

(Continued)

*Primary Examiner* — Hassan A Phillips
*Assistant Examiner* — Mohammed S Chowdhury
(74) *Attorney, Agent, or Firm* — Leffler Intellectual Property Law, PLLC

(57) ABSTRACT

A method is disclosed of constructing a wake-up signal for waking up one or more of a plurality of wireless communication receivers, wherein each of the plurality of wireless communication receivers is adapted to receive in accordance with respective standard. The method comprises selecting a collection of sequences of symbols and dividing the collection of sequences into a plurality of groups, wherein all sequences of a group comprise a same first set of symbols. The method also comprises selecting one of the groups, and letting the first set of symbols of the selected group indicate one or more standards corresponding to the one or more of the wireless communication receivers to be woken up. The wake-up signal is then constructed based on a sequence of symbols of the selected group. The sequences of symbols of the collection may be of different lengths and the selected group may comprise sequences of symbols of different lengths. In such embodiments, the step of dividing the collection of sequences into a plurality of groups may (Continued)

comprise letting a first sequence and a second sequence (wherein the first sequence has a shorter length than the second sequence) belong to a same group if the first sequence and any part of the second sequence (wherein the part has the same length as the first sequence) differ in less than a number of positions. Corresponding arrangement and computer program product are also disclosed.

16 Claims, 2 Drawing Sheets

(56) References Cited

U.S. PATENT DOCUMENTS

| | | | |
|---|---|---|---|
| 2010/0128817 A1 | 5/2010 | Phillips et al. | |
| 2010/0150122 A1 | 6/2010 | Berger et al. | |
| 2014/0051476 A1 | 2/2014 | Chawla et al. | |
| 2014/0211678 A1 | 7/2014 | Jafarian et al. | |
| 2015/0094014 A1 | 4/2015 | Diamond et al. | |
| 2015/0334650 A1 | 11/2015 | Park | |
| 2016/0050516 A1* | 2/2016 | Visweswara | H04B 13/005 455/41.2 |
| 2016/0183187 A1 | 6/2016 | Park | |
| 2016/0234773 A1 | 8/2016 | Choi et al. | |
| 2016/0277994 A1* | 9/2016 | John | H04L 41/0873 |
| 2016/0278013 A1* | 9/2016 | Shellhammer | H04W 84/12 |
| 2017/0332327 A1* | 11/2017 | Fang | H04L 5/0007 |
| 2018/0041959 A1 | 2/2018 | Yang et al. | |
| 2018/0115400 A1* | 4/2018 | Nakajima | H04L 5/0048 |
| 2018/0152333 A1 | 5/2018 | Shellhammer et al. | |
| 2019/0191375 A1 | 6/2019 | Cheng et al. | |
| 2019/0191376 A1 | 6/2019 | Kim et al. | |
| 2019/0289549 A1 | 9/2019 | Lim et al. | |
| 2019/0349857 A1* | 11/2019 | Kim | H04W 48/10 |
| 2020/0006988 A1 | 1/2020 | Leabman | |

FOREIGN PATENT DOCUMENTS

| | | |
|---|---|---|
| JP | 2003169379 A | 6/2003 |
| JP | 2010118855 A | 5/2010 |
| JP | 2012502519 A | 1/2012 |
| JP | 2013162476 A | 8/2013 |
| JP | 2015149640 A | 8/2015 |
| JP | 2015529412 A | 10/2015 |
| JP | 2015530032 A | 10/2015 |
| JP | 2016536844 A | 11/2016 |
| KR | 20150044921 A | 4/2015 |
| WO | 2005069661 A1 | 7/2005 |
| WO | 2008103861 A1 | 8/2008 |
| WO | 2012008823 A1 | 1/2012 |
| WO | 2016081282 A1 | 5/2016 |
| WO | 2016154059 A1 | 9/2016 |

OTHER PUBLICATIONS

IEEE: An Architecture for Sender-based Addressing for Selective Sensor Network Wake-Up Receivers; Johannes Blobel, Janis Krasemann and Falko Dressier; 2016. (Year: 2016).*
PCT International Search Report, dated Aug. 21, 2017, in connection with International Application No. PCT/EP2016/080997, all pages.
PCT Written Opinion, dated Aug. 21, 2017, in connection with International Application No. PCT/EP2016/080997, all pages.
PCT International Search Report, dated Aug. 8, 2017, in connection with International Application No. PCT/EP2016/080995, all pages.
PCT Written Opinion, dated Aug. 8, 2017, in connection with International Application No. PCT/EP2016/080995, all pages.
Korean Office Action dated Jan. 16, 2020 in connection with Korean Application No. 2019-7019009, 7 pages.
English language summary of Korean Office Action dated Jan. 16, 2020 in connection with Korean Application No. 2019-7019009, 3 pages.
Chinese Office Action dated Sep. 29, 2020 in connection with Chinese Application No. 2019-531055, 4 pages.
English language translation of Chinese Office Action dated Sep. 29, 2020 in connection with Chinese Application No. 2019-531055, 4 pages.
Non-Final Office Action dated Aug. 19, 2020 in connection with U.S. Appl. No. 16/470,208, 33 pages.
Final Office Action dated Nov. 17, 2020 in connection with U.S. Appl. No. 16/470,208, 32 pages.
Japanese Office Action dated Nov. 4, 2020 in connection with Japanese Application No. 2019-531060, 4 pages.
English language translations of Japanese Office Action dated Nov. 4, 2020 in connection with Japanese Application No. 2019-531060, 4 pages.
Notice of Allowance dated Feb. 11, 2021 in connection with U.S. Appl. No. 16/470,208, 27 pages.
3GPP TSG-RAN WG1 #87, R1-1612069, Nov. 14-18, 2016, Reno, Nevada, USA, "WF on evaluation for wake-up signal", Qualcom Incorporated, 3 pages.
Tani, T. et al., "Wake-up Frame Detection using Correlated Received Signal Strength for On-Demand WiFi Wake-up", Graduate School of Science and Engineering, Kansai University, IEEE 2014, 5 pages.

* cited by examiner

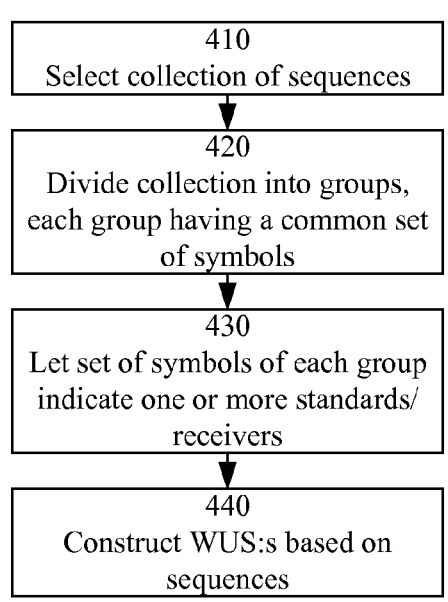
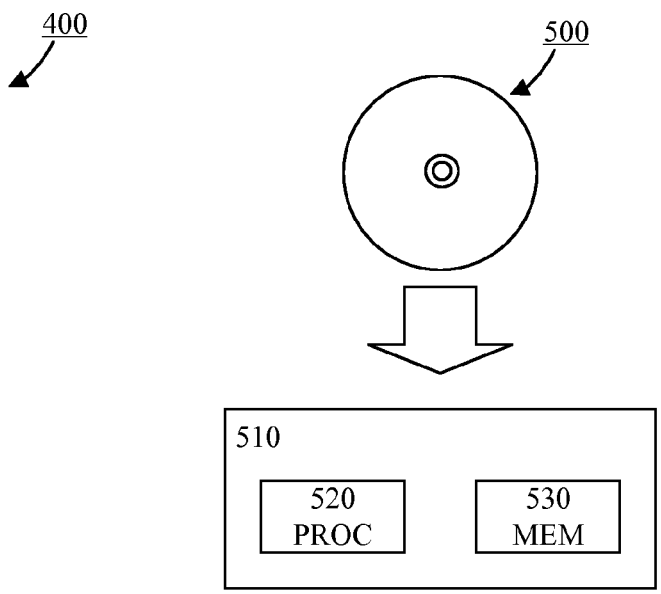
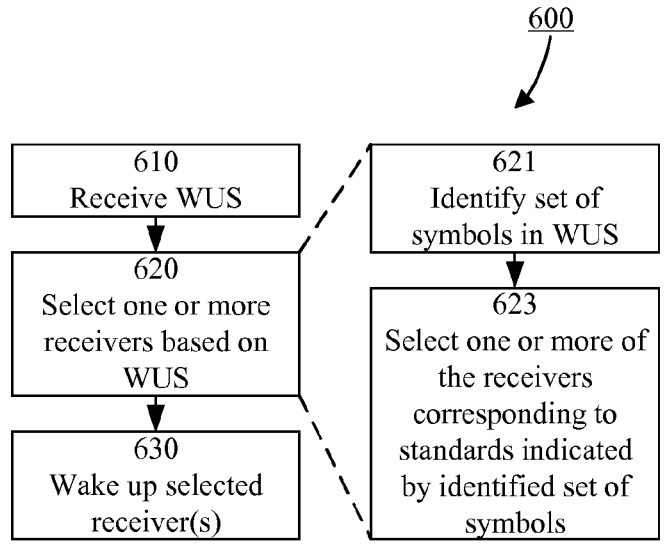
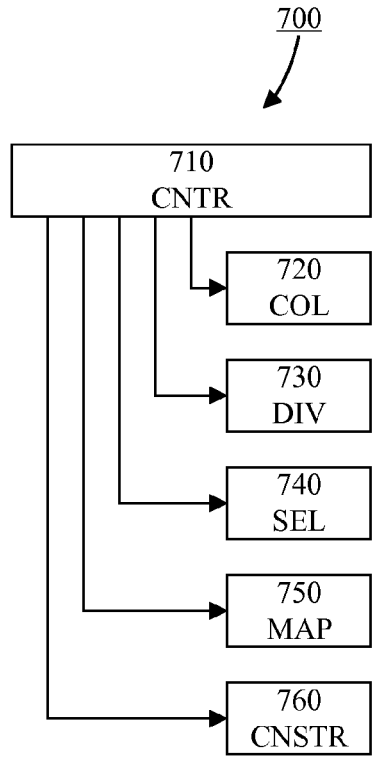

WAKE-UP SIGNAL CONSTRUCTION

TECHNICAL FIELD

The present invention relates generally to the field of wireless communication receivers. More particularly, it relates to construction of wake-up signals for reception by a wake-up radio for wireless communication receivers.

BACKGROUND

There are a relatively large number of wireless communication standards targeting Internet-of-Things (IoT), e.g. those developed by Bluetooth SIG (Special Interest Group), IEEE (Institute of Electrical and Electronics Engineers) 802.11, IEEE 802.15, and 3GPP (Third Generation Partnership Project). Therefore, and in other situations, a wireless communication device may comprise several receivers (or transceivers), each relating to different standards or different versions of a standard.

It is often a desire in relation to wireless communication devices to reduce power consumption. The need to reduce power consumption is often particularly pronounced for wireless communication devices in relation to Internet-of-Things (IoT), where the power source may be the device's own energy harvest (e.g. solar) or low energy batteries that are seldom or never charged or replaced, for example.

For many IoT applications, the supported data rates (typically both peak and average values) are low. Thus, a substantial part of the power is consumed not when the IoT device is transmitting or receiving data, but when the device is in a listening mode to determine whether or not there is a signal for which it is the intended receiver. These conditions motivate using wake-up radios (WUR:s). The concept of using a WUR is known in the art as a means to reduce power consumption in wireless communication devices.

A WUR is a circuit, unit or device which has lower power consumption than a main receiver (typically, extremely low power consumption) and whose only purpose is to wake up a main receiver (or transceiver). Hence, a device having a WUR will not need to turn on its main receiver to scan for potential signals (e.g. a data packet) to receive, since the WUR may be used instead. The WUR can detect that there is a signal for the device to receive by detecting a wake-up signature, or wake-up signal (WUS) that is sent in advance of the signal intended for a main receiver of the device. If the WUR determines, based on the WUS, that there is a signal intended for the device, it will wake up the main receiver (and possibly the transmitter) and a communication link can be established for reception of the signal.

It is a problem that the wake-up radio may erroneously wake up a receiver even though a received WUS was not intended for that purpose. For example, a received WUS may be for waking up a first main receiver adapted to receive in accordance with a particular standard, while the WUR wakes up a second (other) main receiver adapted to receive in accordance with another standard (possibly in addition to the first main receiver). It should be noted that the received WUS resulting in the erroneous wake-up might not even be intended for the wireless communication receiver where the erroneous wake-up takes place.

Such errors unnecessarily increase the power consumption. Furthermore, an erroneous wake-up may result in coexistence issues between the different standards. For example, when a main transceiver is woken up, it may typically send a packet to confirm that it is awake. If that main transceiver should not have been woken up, such a packet may be seen as (unnecessary) interference for other transceivers.

Therefore, there is a need for improved wake-up signaling solutions for wireless communication, and in particular when two or more standards use wake-up signaling.

SUMMARY

It should be emphasized that the term "comprises/comprising" when used in this specification is taken to specify the presence of stated features, integers, steps, or components, but does not preclude the presence or addition of one or more other features, integers, steps, components, or groups thereof.

It should also be noted that problems, embodiments and advantages described herein may be equally applicable in other scenarios than those described above, namely any scenario where more than one coexisting standards apply wake-up signals.

It is an object of some embodiments to solve or mitigate at least some of the above or other disadvantages.

According to a first aspect, this is achieved by a method of constructing a wake-up signal for waking up one or more of a plurality of wireless communication receivers, wherein each of the plurality of wireless communication receivers is adapted to receive in accordance with respective standard.

The method comprises selecting a collection of sequences of symbols and dividing the collection of sequences into a plurality of groups, wherein all sequences of a group comprise a same first set of symbols.

The method also comprises selecting one of the groups and letting the first set of symbols of the selected group indicate one or more standards corresponding to the one or more of the wireless communication receivers to be woken up.

The method comprises constructing the wake-up signal based on a sequence of symbols of the selected group.

A standard may, for example, comprise a communication standard (or a version of a communication standard) determined by any of the Bluetooth SIG, the IEEE, and 3GPP. A communication standard is understood to comprise a definition of a standardized communication protocol, including reception and/or transmission.

Constructing the wake-up signal based on the sequence of symbols may, for example, comprise including the sequence in the preamble of a packet or a physical layer header of a packet, and modulating the sequence for wireless transmission. The symbols may be bits. Modulating the sequence may be achieved by indicating bits using on/off keying (OOK), amplitude shift keying (ASK), or Frequency Shift Keying (FSK), for example.

Each first set of symbols may indicate one or more standards unambiguously. For example, a first set of symbols may indicate exactly one standard unambiguously. Alternatively, two or more standards may be indicated by a same first set of symbols. Yet alternatively, a first set of symbols may be used to indicate that receivers relating to any of two or more standards are to be woken up (and which standards).

In some embodiments, the wake-up signals may be for transmission in a frequency band used for transmission of wake-up signals of the respective standard for each (or at least some) of the plurality of wireless communication receivers. Such a frequency band may be a pre-defined frequency band.

According to some embodiments, the method may further comprise dividing the selected group into a plurality of sub-groups (wherein all sequences of a sub-group comprise a same second set of symbols), selecting one of the sub-groups, letting the second set of symbols of the selected sub-group indicate a cell of a cellular communication network (the one or more of the wireless communication receivers to be woken up belonging to the indicated cell), and constructing the wake-up signal based on a sequence of symbols of the selected group and of the selected sub-group.

When used herein, a cellular communication network is meant to include any networks using a base station concept, e.g. cellular communication networks that support a conventional cellular communication standard (e.g. defined by 3GPP) and WiFi networks using access points that support a Wireless Local Area Network (WLAN) standard (e.g. defined by IEEE). Similarly, a cell is used to refer to a conventional cell of a conventional cellular communication network, but also to the identity of an access point of any suitable kind.

The selection of the collection of sequences may, in some embodiments, comprise selecting sequences that have mutual distances that exceed a minimum distance threshold. The distance may, for example, be measured in terms of Hamming distance.

The collection of sequences may, for example, correspond to the code words of an error correcting code, e.g. an error correcting block code. Then, the wake-up signal may be based on a particular code word of the error correcting code, and the set of symbols may be a part of that code word. The collection of possible first sets of symbols may be all different symbol sequences that are possible for the part of the code word in the error correcting code.

According to some embodiments, the sequences of symbols of the collection comprise sequences of symbols of different lengths. For example, the collection may comprise a plurality of sequences having a first length and a plurality of sequences having a second length. Furthermore, the selected group may, in some embodiments, comprise sequences of symbols of different lengths.

In embodiments where the collection comprises sequences of symbols of different lengths, the step of dividing the collection of sequences into a plurality of groups may comprise letting a first sequence and a second sequence (wherein the first sequence has a shorter length than the second sequence) belong to a same group if the first sequence and any part of the second sequence (wherein the part has the same length as the first sequence) differ in less than a number of positions.

The number may, for example, be one such that the first sequence and the second sequence belong to the same group if the first sequence appears as a part of the second sequence. Generally, the number may be any suitable number between one (inclusive) and the length of the first sequence (exclusive).

A second aspect is a method of a wireless communication transmitter for indicating upcoming signaling. The method comprises transmitting a wake-up signal for reception by a wake-up radio unit, wherein the wake-up signal is constructed in accordance with the first aspect.

A third aspect is a method of a wireless communication device having a plurality of wireless communication receivers. The method comprises receiving, by a wake-up radio unit, a wake-up signal constructed in accordance with the first aspect, identifying the first set of symbols of the received wake-up signal, selecting one or more wireless communication receivers adapted to receive in accordance with the one or more corresponding standards indicated by the identified first set of symbols, and waking up the selected one or more wireless communication receiver.

A fourth aspect is a computer program product comprising a computer readable medium, having thereon a computer program comprising program instructions, the computer program being loadable into a data-processing unit and adapted to cause execution of the method according to the first, second or third aspect when the computer program is run by the data-processing unit.

A fifth aspect is an arrangement for constructing a wake-up signal for waking up one or more of a plurality of wireless communication receivers, wherein each of the plurality of wireless communication receivers is adapted to receive in accordance with respective standard.

The arrangement comprises a controller adapted to cause selection (e.g. by a collection selector) of a collection of sequences of symbols, division (e.g. by a divider) of the collection of sequences into a plurality of groups wherein all sequences of a group comprise a same first set of symbols, selection (e.g. by a selector) of one of the groups, letting (e.g. by a mapper) the first set of symbols of the selected group indicate one or more standards corresponding to the one or more of the wireless communication receivers to be woken up, and construction (e.g. by a constructor) of the wake-up signal based on a sequence of symbols of the selected group.

A sixth aspect is an arrangement for a wireless communication transmitter for indicating upcoming signaling. The arrangement comprises a controller adapted to cause transmission of a wake-up signal for reception by a wake-up radio unit, wherein the wake-up signal is constructed in accordance with the first aspect.

A seventh aspect is an arrangement for a wireless communication device having a plurality of wireless communication receivers. The arrangement comprises a controller adapted to cause reception, by a wake-up radio unit, of a wake-up signal constructed in accordance with the first aspect. The controller is also adapted to cause identification of the first set of symbols of the received wake-up signal, selection of one or more wireless communication receivers adapted to receive in accordance with the one or more corresponding standards indicated by the identified first set of symbols, and waking up of the selected one or more wireless communication receiver.

Typically, each of the plurality of wireless communication receivers may be adapted to receive in accordance with respective standard.

The wake-up radio unit may be adapted to wake up one, some or any of the plurality of wireless communication receivers according to some embodiments.

The plurality of wireless communication receivers may, for example, consist of two or more wireless communication receivers. Each wireless communication receiver may or may not be part of a wireless communication transceiver which the wake-up radio is adapted to wake up as a whole. The wireless communication device may also comprise other wireless communication receivers (or transceivers) that the wake-up radio unit is not adapted to wake up.

To wake up a receiver may, for example, comprise switching on a power supply to the receiver, cause an antenna signal to be conveyed to the receiver, and/or enabling operation of the receiver.

If more than one wireless communication receiver is adapted to receive in accordance with the one or more corresponding standards indicated by the identified set of symbols, the wake-up radio unit may, in some embodiments, be adapted to select only one (or a subset of, or all of) of those wireless communication receivers. The selection may be based on a likelihood of the identified set of symbols (e.g. largest correlation metric) and/or on a prioritization among the wireless communication receivers.

In some embodiments, any of the above aspects may additionally have features identical with or corresponding to any of the various features as explained above for any of the other aspects.

An advantage of some embodiments is that efficient use of wake-up radios is enabled in situations where more than one standard using wake-up signals coexist (geographically, frequency band wise, and/or otherwise).

Another advantage of some embodiments is that decreased power consumption is enabled.

Yet an advantage of some embodiments is that efficient use and implementation of wake-up radios is provided for in multi-standard implementations.

Embodiments provide for that different standards do not apply coinciding wake-up signals, thus reducing the risk or erroneously waking up a receiver.

Some embodiments allow use of the space of wake-up signals to avoid adversely impacting wake-up radios already in use.

BRIEF DESCRIPTION OF THE DRAWINGS

Further objects, features and advantages will appear from the following detailed description of embodiments, with reference being made to the accompanying drawings, in which:

FIG. 4 is a flowchart illustrating example method steps according to some embodiments;

FIG. 5 is a schematic drawing illustrating a computer readable medium according to some embodiments;

FIG. 6 is a flowchart illustrating example method steps according to some embodiments; and FIG. 7 is a schematic block diagram illustrating an example wake-up signal construction arrangement according to some embodiments.

DETAILED DESCRIPTION

In the following, embodiments will be described where a wake-up signal is constructed and used. The wake-up signal is for waking up one or more of a plurality of wireless communication receivers, wherein each of the plurality of wireless communication receivers is adapted to receive in accordance with respective standard. Thus, some embodiments introduce wake-up signals for multi-standard support.

According to some embodiments, each standard is assigned a group of sequences (where the group may consist of one or more sequences). Preferably, but not necessarily, no sequence is comprised on two groups which are assigned exclusively to different standards. In some embodiments, a group of sequences may deliberately be assigned to a collection of two or more standards to indicate that all receivers adapted to receive in accordance with any of these standards should be woken up.

In some embodiments, this is achieved by letting certain symbols (e.g. bits) of a wake-up signal denote (indicate) the standard(s) relevant in relation to the wake-up signal.

Some embodiments may be particularly useful for a wireless communication device comprising a wake-up radio (WUR) unit for multi-standard support, i.e., a single WUR unit adapted to support wake-up operation for more than one receiver, wherein the receivers are adapted to receive in accordance with respective standards. Such a WUR unit is typically able to receive and detect wake-up signals (WUS) relating to more than one standard. Based on detection of a WUS (which indicates the standard(s) associated with the WUS), the WUR unit selects which one(s) of the receivers to wake up, while the remaining receivers are left in their respective sleep modes.

Figure 1:
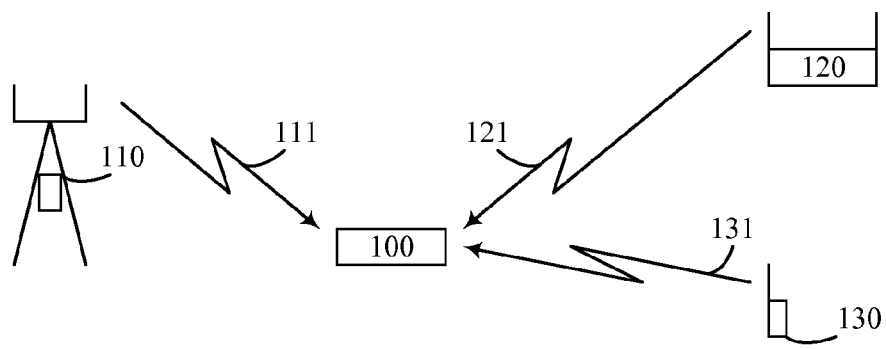
FIG. 1 is a schematic drawing illustrating an example scenario for a multi-standard wireless communication device according to some embodiments.

FIG. 1 schematically illustrates a scenario relevant in relation to some embodiments where a wireless communication device 100 may receive signals (111, 121, 131) relating to different standards. In the example of FIG. 1, the signal 111 is received from a base station 110 of a cellular communication system (e.g. in accordance with a 3GPP standard, such as UMTS LTE—Universal Mobile Telecommunication Standard, Long Term Evolution), the signal 121 is received from an access point 120 of a wireless local area network system (e.g. in accordance with an IEEE 802.11 standard), and the signal 131 is received from another wireless communication device 130 (e.g. in accordance with a Bluetooth standard, such as Bluetooth Low Energy—BLE). To be able to receive these different types of signals, the wireless communication device 100 needs respective corresponding receivers. The power consumption typically increases with the number of receivers of a device and the wake-up radio concept may be used to decrease power consumption as described above. Different wake-up signals may be used by the base station 110, the access point 120 and the other wireless communication device 130 to specify which receiver(s) of the wireless communication device 100 to be woken up.

Figure 2:
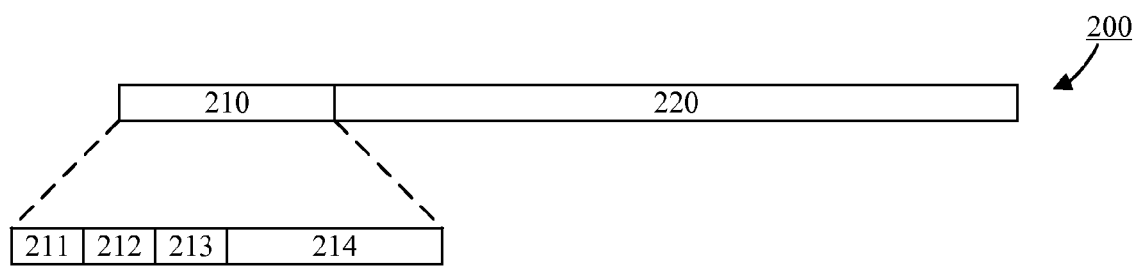
FIG. 2 is a schematic drawing illustrating an example wake-up signal construction according to some embodiments.

FIG. 2 illustrates an example wake-up signal construction according to some embodiments. The example wake-up signal is constructed based on a sequence of symbols 200. The sequence of symbols may, for example, be a code word of an error correcting block code.

The wake-up signal is for waking up one or more of a plurality of wireless communication receivers, wherein each of the plurality of wireless communication receivers is adapted to receive in accordance with respective standard.

One or more parts (first set of symbols) 211, 212 of the sequence 200 are assigned to indicate the one or more standards corresponding to the one or more of the wireless communication receivers to be woken up. For example, the part 211 may indicate the number of standards and the part 212 may indicate which standard(s).

Another part (second set of symbols) 213 of the sequence 200 may be assigned to indicate a cell of a cellular communication network, the indicated cell corresponding to the one or more of the wireless communication receivers to be woken up, wherein the term cell is to be interpreted as indicated before.

Alternatively or additionally, various parts of the sequence may be assigned to indicate other parameters in relation to defining which one(s) of the wireless communication receivers to be woken up.

The sequence 200 may, for example, be a code word of an error correcting block code. The first and second sets of symbols 211, 212, 213 referred to above may, typically, be comprised in the information symbols 210 of the code word. The remaining part (if any) 214 of the information symbols 210 may provide for that several different wake-up signals are available for use by each standard. The code symbols 220 provide for that the different sequences have mutual distances that equal or exceed a minimum distance threshold.

Figure 3:
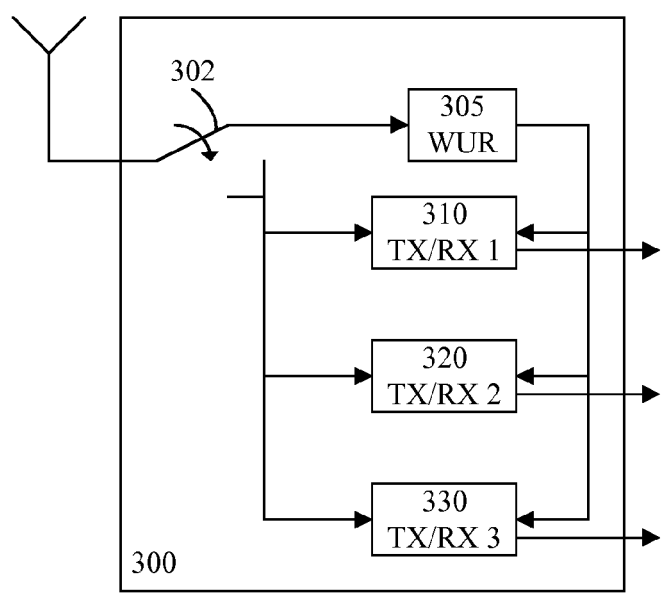
FIG. 3 is a schematic block diagram illustrating an example arrangement of a wake-up radio architecture for a multi-standard wireless communication device according to some embodiments.

The wake-up signals according to embodiments described herein are useful for any situation where more than one coexisting standards applies wake-up signals. FIG. 3 schematically illustrates an example arrangement 300 of a wake-up radio architecture for a multi-standard wireless communication device, which may be used in such situations. The arrangement 300 may, for example, be comprised in the wireless communication device 100 of FIG. 1.

The implementation comprises a plurality of transceivers (TX/RX 1,2,3) 310, 320, 330 corresponding to a respective standard. The three transceivers 310, 320, 330 may, for example, be adapted to receive respective ones of the signals 111, 121, 131 of FIG. 1. For simplicity of illustration a single antenna is assumed for all of the transceivers.

In this example, all of the transceivers 310, 320, 330 are associated with a same wake-up radio unit (WUR) 305. However, embodiments are equally applicable when some or all of the transceivers 310, 320, 330 are each associated with a respective wake-up radio units (WUR).

Starting in an idle mode, the switch 302 will be in the location indicated in FIG. 3, conveying the antenna signal to the wake-up radio unit 305, while the transceivers 310, 320, 330 are in respective sleep modes. The wake-up radio unit 305 monitors the WUS:s of all standards of the corresponding transceivers 310, 320, 330, and when the wake-up radio unit detects a WUS (compare with FIG. 2) relating to any of these standards and intended for the wireless communication device, it wakes up the corresponding transceiver (say, TX/RX 3, 330) and causes the switch 302 to shift position so that the antenna signal is conveyed to the main transceivers instead of the wake-up radio unit. Then the woken-up transceiver communicates as standardized until it enters sleep mode again and causes the switch 302 to shift position to the location indicated in FIG. 3.

In the example shown in FIG. 3, the same antenna is used for the WUR (305) and the different main transceivers (310, 320, 330), and a switch (302) is used to illustrate whether or not only the WUR is active. This is merely illustrative to emphasize that only the WUR is active until the WUS has been detected, after which one or more of the main transceivers become active. It is to be understood that embodiments are not restricted to the use of a single common antenna, but may also be applicable when, for example, all (or some of) the main transceivers have different antennas (e.g. due to operation in different frequency bands) and/or when a WUR has a separate antenna. The WUR having a separate antenna may, for example, be applicable if the WUS is sent using a frequency which differs (possibly substantially) from the frequencies used by any of the main transceivers for any of the standards supported by the device.

Thus, FIG. 3 illustrates an example arrangement 300 for a wireless communication device, wherein the arrangement comprises a wake-up radio unit 305 and a plurality of wireless communication receivers 310, 320, 330. The wake-up radio unit 305 is adapted to wake up any of the plurality of wireless communication receivers 310, 320, 330 by receiving a wake-up signal, selecting one or more of the plurality of wireless communication receivers 310, 320, 330 based on the wake-up signal, and waking up the selected one or more wireless communication receiver.

As described above, a set of symbols of the WUS may be dedicated to indicate a standard. Each standard may be associated with a single set of symbols or with a group of sets of symbols. Similarly, each set of symbol may be associated with a single standard or several standards may be associated with the same set of symbols. In some embodiments, the set of symbols have a certain sub-set which indicates whether only one or several (and possibly how many) receivers relating to different standards should be woken up. Thus, the set of symbols indicates, at least in part, one or more corresponding standards.

The wake-up radio unit 305 may, thus, be adapted to select one or more of the plurality of wireless communication receivers 310, 320, 330 based on the wake-up signal by identifying the set of symbols of the received wake-up signal, and selecting the one or more wireless communication receivers adapted to receive in accordance with the one or more corresponding standards indicated by the identified set of symbols.

If more than one wireless communication receiver is adapted to receive in accordance with the one or more corresponding standards indicated by the identified set of symbols, the wake-up radio unit may be adapted to select only one, or a subset of, or all of those wireless communication receivers. The selection may be based on a likelihood of the identified set of symbols (e.g. largest correlation metric) and/or on a prioritization among the wireless communication receivers. As mentioned above, there may also be an indication in the WUS as to how many (and possibly which) wireless communication receivers should be selected in such cases.

According to some embodiments, the wake-up radio unit 305 may be adapted to identify the set of symbols of the received wake-up signal by correlating the received wake-up signal with a possible set of symbols to achieve a correlation metric, and identifying the set of symbols of the received wake-up signal as the possible set of symbols if the correlation metric meets a correlation criterion.

The correlation criterion may, for example, comprise the correlation metric being larger than a correlation threshold value, the correlation being the largest correlation metric among a group of correlation metrics relating to different possible sets of symbols, or a combination of these two criteria.

FIG. 4 illustrates an example method 400 of constructing a wake-up signal (compare with FIG. 2) for waking up one or more of a plurality of wireless communication receivers, wherein each of the plurality of wireless communication receivers is adapted to receive in accordance with respective standard.

In step 410, a collection of sequences of symbols is selected. Typically, this step may comprise selecting an error correcting block code and the collection of sequences corresponds to the collection of all code words in the code.

The collection of sequences is divided into a plurality of groups in step 420, wherein all sequences of a group comprise a same first set of symbols. Typically, the same first set of symbols comprises a part 211, 212 of the information symbols of the code word having the same content.

In step 430, a group is selected for each standard (and for each group of standards when woken up collectively) and the first set of symbols of the selected group are used to indicate which standard(s) the wake-up signal relates to, hence constructing the WUS:s based on the selection.

According to some embodiments, it may be desirable to use wake-up signals of different length in different situations (e.g. depending on channel conditions or similar). To achieve this, two or more error correcting codes with different block length may be used, and each standard may be assigned one or more code word of each block length (i.e. each group comprises sequences of different length).

In such embodiments, step 420 may comprise letting a first sequence and a second sequence (wherein the first sequence has a shorter length than the second sequence) belong to a same group if the first sequence and any part of the second sequence (wherein the part has the same length as the first sequence) differ in less than a number of positions.

FIG. 5 schematically illustrates an example computer readable medium 500 according to some embodiments, having thereon a computer program comprising program instructions. The computer program is loadable into a data-processing unit (PROC) 520 where it may be stored in a memory (MEM) 530 associated with the data-processing unit. When loaded into and run by the data-processing unit 520, the computer program is adapted to cause execution of the method described, for example, in connection to any of the FIGS. 4 and 6. The data-processing unit 520 and the memory 530 may be comprised in, for example, a wireless communication device, a base station, or other device 510 suitable for construction of wake-up signals.

FIG. 6 illustrates an example method 600 carried out by a wireless communication device having a plurality of wireless communication receivers, each adapted to receive in accordance with respective standard. In step 610, a wake-up signal is received by a wake-up radio unit, where the wake-up signal is constructed as described herein. In step 620, one or more of the receivers are selected based on the received WUS, and in step 630, the selected receiver(s) are woken up. The selection in step 620 typically comprises identifying the first set of symbols of the received wake-up signal as illustrated by sub-step 621, and selecting the one or more wireless communication receivers adapted to receive in accordance with the one or more corresponding standards indicated by the identified first set of symbols as illustrated by sub-step 623.

FIG. 7 schematically illustrates an example arrangement 700 for constructing a wake-up signal for waking up one or more of a plurality of wireless communication receivers, wherein each of the plurality of wireless communication receivers is adapted to receive in accordance with respective standard. The arrangement may, for example, be adapted to cause execution of the method described in relation to FIG. 4.

The arrangement comprises a controller (CNTR) 710 adapted to cause selection (e.g. by a collection selector (COL) 720) of a collection of sequences of symbols, division (e.g. by a divider (DIV) 730) of the collection of sequences into a plurality of groups wherein all sequences of a group comprise a same first set of symbols, selection (e.g. by a selector (SEL) 740) of one of the groups, letting (e.g. by a mapper (MAP) 750) the first set of symbols of the selected group indicate one or more standards corresponding to the one or more of the wireless communication receivers to be woken up, and construction (e.g. by a constructor (CNSTR) 760) of the wake-up signal based on a sequence of symbols of the selected group.

Thus, in multi-standard WUS design it is suggested that construction of WUS:s for one standard takes into account whether there are (potential) WUS:s for other standards. Preferably, overlap of WUS:s between standards is avoided, such that a particular WUS is not used for more than one standard (except when it is explicitly desirable to wake up receivers relating to more than one standard).

Some typical properties of a WUS intended for a particular standard will now be discussed. In a simple implementation, a standard may only have a single WUS. In such situations, a corresponding WUR may be hard coded to scan for this WUS.

To allow for very low power consumption in the WUR, the modulation used for WUS is often on-off keying (OOK), but other alternatives are possible, such as the more general amplitude shift keying (ASK) or Frequency Shifty Keying (FSK). In on-off keying, a logical one is represented by the presence of a signal whereas a logical zero is represented by the absence of a signal.

A typical WUS may consist of bits. The duration of a bit (or more generally, a symbol) in a WUS may vary. An example duration may be in the range 1-25 us corresponding to a bit rate of 40 kb/s-1 Mb/s.

One objective in the design of a multi-standard WUS may be to facilitate the implementation of a WUS transmitter in network nodes (e.g. base stations and/or access points) by means of software upgrades and re-using the existing chip-sets and transceiver designs. This would reduce implementation cost and accelerate time to market. For this reason, it may be advantageous to choose the bit rate of the multi-standard WUS in such a way that it facilitates the digital implementation of the WUS transmitter. Each standard has a nominal sampling rate. The oscillators and circuitry in a transceiver compliant with a given standard are generally designed to allow the generation of signals at rates corresponding to integer multiples of the nominal sampling rate. In some embodiments, the bit rate of a multi-standard WUS is therefore chosen so that one bit period corresponds to an integer number of nominal clock periods in two or more of the standards.

As a first example, suppose that the standards of interest are UMTS LTE having a nominal sampling frequency of 30.72 MHz and IEEE 802.11 having a nominal sampling frequency of 20 MHz. Then, the bit rate of the WUS may be chosen to be 160 kb/s, which yields a bit period of 6.25 us (corresponding to 125 ticks of a clock with a tick rate of 20 MHz, and to 192 ticks of a clock with a tick rate of 30.72 MHz).

As a second example, suppose that the standards of interest also include BLE having a nominal sampling frequency of 1 MHz. Then, the bit rate of the WUS may be chosen to be 40 kb/s, which yields a bit period of 25 us (corresponding to 500 ticks of a clock with a tick rate of 20 MHz, to 768 ticks of a clock with a tick rate of 30.72 MHz, and to 25 ticks of a clock with a tick rate of 1 MHz).

As discussed above, the length of a WUS may also vary, for example, depending on the required sensitivity. In some embodiments, a WUS may consist of a few hundred bits.

The WUR may typically comprise an envelope detector followed by one or more correlators. The envelope detector is used to discriminate whether there is any signal present and the correlator then identifies a particular WUS. The output from the envelope detector may be hard (i.e., a single bit) or soft (i.e., also reflecting certainty). Soft information gives better performance at a slightly higher complexity.

If only a single WUS is available all receivers are woken up, and if only a single WUS is available per standard all receivers adapted to receive in accordance with tat standard are woken up. As this clearly is not a good solution, a standard should typically be able to support a relatively large number of different WUS:s, and each device may be allocated a different WUS (up to a maximum number of devices).

In some situations, it may be desirable to wake up a group of devices. Having to wake up one device at a time in such situations would be inefficient, so a group of devices may be allocated a specific WUS (possibly in addition to respective device specific WUS) to wake up all of those devices with one WUS.

When several WUS:s are in use, it becomes increasingly important that the different WUS:s are not too similar to avoid erroneous wake-ups. If $2^k$ different WUS:s are needed and each WUS is to consist of n bits, the construction of such a set may be achieved by equivalently designing a (n,k) block code (k information bits encoded into code words of length n).

In some embodiments, the collection of WUS:s to be used for multiple standards may be effectively designed simultaneously and based on error correcting codes. A standard may be included in this process for future purposes even if it does not yet use WUS.

For example, suppose that WUS:s for four different standards are to be designed, that all of these standards allow for $2^{11}$=2048 different WUS:s (in total $2^{13}$=8192 WUS:s), and that the length of a WUS is to be 255 bits.

A suitable set of WUS:s may then be found by basing the design on a (255,13) binary BCH code, which is known to have minimum distance of at least 119. A systematic code may be used as an example, where the 13 information bits are transmitted as the first 13 bits of the 255 bits in the WUS.

The two first bits may be chosen to denote a respective standard and the other information bits (bits 3-13) may be used by respective standard in any suitable way (e.g., addressing different devices, addressing groups of devices, or only using one WUS without discriminating between devices).

As mentioned above, some embodiments provide for a possibility to wake up two or more standards using the same WUS. This may, for example, be achieved by allocating a specific bit pattern in the standard specific field to that combination of standards.

In the example above, the three first bits may be chosen instead to denote the respective standard(s). The first bit may be set to zero when only one standard is to be woken up (the second and third bits indicating which) and set to one when more than one standard is to be woken up (the second and third bits then indicating which combination).

A WUS design based on error correcting codes ensures good distances properties between different code words assuming that the code words are aligned. However, if the codes are cyclic, i.e., a cyclic shift of a codeword is also a codeword, then the distance between one code word and a shifted version of another code word is zero, which may be disadvantageous in relation to the WUR correlation approach. Therefore, according to some embodiments, cyclic shifts of code words may be excluded before WUS construction form the collection of sequences used. Alternatively, a predetermined pseudo-random sequence may be XOR:ed with each code word to generate the WUS, whereby the distance properties of the code will be maintained but the likelihood for cyclic shifts in the collection of sequences used will decrease.

An alternative to using error correcting codes for WUS construction is to use sequences with good auto-correlation properties (i.e., a very distinct correlation peak) and low cross-correlation between sequences (preferably irrespective of time-shifts of the sequences). Examples of such sequences are Gold sequences and Zadoff-Chu sequences.

If, for example, the WUS design is based on Gold sequences, such sequences can be generated by taking the XOR of the outputs of two maximum length shift registers (MLSR) of the same length N, each generating a maximum length sequence of length $2^N-1$. Different Gold sequences may be generated by using different relative shifts from the MLSR:s.

The length of the WUS is, at least to some extent, related to the performance of the WUR; the longer the WUS, the better performance (e.g. low probability of missed detection and/or false alarm). As the performance in a specific situation typically depends on the path loss from the transmitter to the receiver, it may be that in some situations a long WUS is not needed to fulfill the requirements, but a much shorter WUS may be sufficient. Therefore, it may be beneficial using WUS:s of different lengths, selected depending on the expected actual channel conditions, as mentioned above.

Returning to the example of the n=255 error correcting block code, construction of WUS:s of different lengths will now be exemplified. In this example, the values of n are chosen to be roughly doubled in each step: $n_1$=63, $n_2$=127, $n_3$=255, and $n_4$=511. As before, the two first bits may be used to indicate the respective standard (in all of the four lengths). Then, either the number of information bits are kept equal for all four length alternatives (resulting in the same number available of WUS irrespective of the length, but a minimum mutual distance that becomes small for short length WUS:s) or the number of information bits is made proportional to the length of the WUS (resulting in a less number of available of WUS for short length WUS:s, but a minimum mutual distance that becomes does not decrease as fast with the WUS length as for the other alternative).

Having different length WUS:s introduces a risk that a long WUS erroneously wakes up a receiver corresponding to a shorter WUS (which appears, exactly or approximately, as a part in the long WUS). Therefore, in some embodiments, a WUS of a certain length may be verified to not contain any sequences that differ in less than a predefined number of positions from any of the shorter WUS:s in question before it is used. This may be performed either on the fly or beforehand storing the result (e.g. in a look-up table).

One way to accomplish this if performed on the fly is by running the long WUS through a correlator set to identify the shorter WUS and evaluate the correlation peak. If the peak is below a threshold value, the long WUS may be determined not to interfere with the shorter WUS.

If performed off-line, a brute force method may be applied, performing an exhaustive search. In some embodiments, this approach may include determining which are the best combinations of WUS:s of different lengths in terms of cross-correlation.

As mentioned above, a WUS may also carry an indication regarding which cell it relates to in a cellular communication network, wherein the term cell is to be interpreted as indicated before. This has the benefit of reducing the probability of erroneous wake ups when two or more network nodes select the same WUS.

In some embodiments, this is achieved by letting a part of the WUS indicate the cell as described in connection with FIG. 2, wherein the term cell is to be interpreted as indicated before. Such embodiments typically need coordination among the network nodes to distribute respective cell identifiers.

To avoid the need for coordination between network nodes, some embodiments apply an approach where a (network node generated) random sequence is XOR:ed with the WUS bits that are not standard identifying before the WUS is used.

The described embodiments and their equivalents may be realized in software or hardware or a combination thereof. They may be performed by general-purpose circuits associated with or integral to a communication device, such as digital signal processors (DSP), central processing units (CPU), co-processor units, field-programmable gate arrays (FPGA) or other programmable hardware, or by specialized circuits such as for example application-specific integrated circuits (ASIC). All such forms are contemplated to be within the scope of this disclosure.

Embodiments may appear within an electronic apparatus comprising arrangements/circuitry/logic or performing methods according to any of the embodiments.

According to some embodiments, a computer program product comprises a computer readable medium such as, for example, a USB-stick, a plug-in card, an embedded drive, or a read-only memory (ROM) such as the CD-ROM 500 illustrated in FIG. 5. The computer readable medium may have stored thereon a computer program comprising program instructions. The computer program may be loadable into a data-processing unit, which may, for example, be comprised in an electronic device. When loaded into the data-processing unit, the computer program may be stored in a memory associated with or integral to the data-processing unit. According to some embodiments, the computer program may, when loaded into and run by the data-processing unit, cause execution of method steps according to, for example, the methods shown in any of the FIG. 4 or 6.

Reference has been made herein to various embodiments. However, a person skilled in the art would recognize numerous variations to the described embodiments that would still fall within the scope of the claims. For example, the method embodiments described herein describes example methods through method steps being performed in a certain order. However, it is recognized that these sequences of events may take place in another order without departing from the scope of the claims. Furthermore, some method steps may be performed in parallel even though they have been described as being performed in sequence.

In the same manner, it should be noted that in the description of embodiments, the partition of functional blocks into particular units is by no means limiting. Contrarily, these partitions are merely examples. Functional blocks described herein as one unit may be split into two or more units. In the same manner, functional blocks that are described herein as being implemented as two or more units may be implemented as a single unit without departing from the scope of the claims.

Hence, it should be understood that the details of the described embodiments are merely for illustrative purpose and by no means limiting. Instead, all variations that fall within the range of the claims are intended to be embraced therein.

The invention claimed is:

1. A method of waking up one or more of a plurality of wireless communication receivers, wherein each of the plurality of wireless communication receivers is adapted to receive in accordance with a respective standard, the method comprising:
selecting a collection of sequences of symbols;
dividing the collection of sequences into a plurality of groups, wherein all sequences of a group comprise a same first set of symbols;
selecting one of the groups;
letting the first set of symbols of the selected group indicate one or more standards corresponding to the one or more of the wireless communication receivers to be woken up;
constructing a wake-up signal based on a sequence of symbols of the selected group; and
transmitting the wake-up signal for reception by a wake-up radio unit that is associated with one of the plurality of wireless communication receivers,
wherein each sequence in the collection of sequences is a code word of an error correcting block code.

2. The method of claim 1 further comprising:
dividing the selected group into a plurality of sub-groups, wherein all sequences of a sub-group comprise a same second set of symbols;
selecting one of the sub-groups;
letting the second set of symbols of the selected sub-group indicate a cell of a cellular communication network, the indicated cell corresponding to the one or more of the wireless communication receivers to be woken up; and
constructing the wake-up signal based on the sequence of symbols of the selected group and of the selected sub-group.

3. The method of claim 1, wherein the selection of the collection of sequences comprises selecting sequences that have mutual distances that equal or exceed a minimum distance threshold.

4. The method of claim 1, wherein the sequences of symbols of the collection comprise sequences of symbols of different lengths.

5. The method of claim 4, wherein the selected group comprises sequences of symbols of different lengths.

6. The method of claim 4, wherein the step of dividing the collection of sequences into the plurality of groups comprises:
letting a first sequence and a second sequence, wherein the first sequence has a shorter length than the second sequence, belong to a same group if:
the first sequence and any part of the second sequence, wherein the part has the same length as the first sequence, differ in less than a number of positions.

7. A method of a wireless communication device having a plurality of wireless communication receivers, the method comprising:
receiving, by the wake-up radio unit, the wake-up signal constructed in accordance with claim 1;
identifying the first set of symbols of the received wake-up signal;
selecting one or more of the wireless communication receivers adapted to receive in accordance with the one or more corresponding standards indicated by the identified first set of symbols; and
waking up the selected one or more wireless communication receiver.

8. A nontransitory computer readable medium, having thereon a computer program comprising program instructions, the computer program being loadable into a data-processing unit and adapted to cause execution of a method when the computer program is run by the data-processing unit, wherein the method is for waking up one or more of a plurality of wireless communication receivers, wherein each of the plurality of wireless communication receivers is adapted to receive in accordance with a respective standard, and wherein the method comprises:
selecting a collection of sequences of symbols;

dividing the collection of sequences into a plurality of groups, wherein all sequences of a group comprise a same first set of symbols;

selecting one of the groups;

letting the first set of symbols of the selected group indicate one or more standards corresponding to the one or more of the wireless communication receivers to be woken up;

constructing a wake-up signal based on a sequence of symbols of the selected group; and transmitting the wake-up signal for reception by a wake-up radio unit that is associated with one of the plurality of wireless communication receivers, wherein each sequence in the collection of sequences is a code word of an error correcting block code.

9. An arrangement for waking up one or more of a plurality of wireless communication receivers, wherein each of the plurality of wireless communication receivers is adapted to receive in accordance with a respective standard, the arrangement comprising a controller adapted to cause:

selection of a collection of sequences of symbols;

division of the collection of sequences into a plurality of groups, wherein all sequences of a group comprise a same first set of symbols;

selection of one of the groups;

letting the first set of symbols of the selected group indicate one or more standards corresponding to the one or more of the wireless communication receivers to be woken up;

construction of a wake-up signal based on a sequence of symbols of the selected group; and transmission of the wake-up signal for reception by a wake-up radio unit that is associated with one of the plurality of wireless communication receivers, wherein each sequence in the collection of sequences is a code word of an error correcting block code.

10. The arrangement of claim 9 wherein the controller is further adapted to cause:

division of the selected group into a plurality of sub-groups, wherein all sequences of a sub-group comprise a same second set of symbols;

selection of one of the sub-groups;

letting the second set of symbols of the selected sub-group indicate a cell of a cellular communication network, the indicated cell corresponding to the one or more of the wireless communication receivers to be woken up; and construction of the wake-up signal based on the sequence of symbols of the selected group and of the selected sub-group.

11. The arrangement of claim 9, wherein the controller is adapted to cause the selection of the collection of sequences by causing selection of sequences that have mutual distances that equal or exceed a minimum distance threshold.

12. The arrangement of claim 9, wherein the sequences of symbols of the collection comprise sequences of symbols of different lengths.

13. The arrangement of claim 12, wherein the selected group comprises sequences of symbols of different lengths.

14. The arrangement of claim 12, wherein the controller is adapted to cause division of the collection of sequences into the plurality of groups by causing:

letting a first sequence and a second sequence, wherein the first sequence has a shorter length than the second sequence, belong to a same group if:

the first sequence and any part of the second sequence, wherein the part has the same length as the first sequence, differ in less than a number of positions.

15. An arrangement for a wireless communication transmitter for indicating upcoming signaling, the arrangement comprising a controller adapted to cause transmission of a wake-up signal for reception by a wake-up radio unit, wherein the wake-up signal is constructed by:

selecting a collection of sequences of symbols;

dividing the collection of sequences into a plurality of groups, wherein all sequences of a group comprise a same first set of symbols;

selecting one of the groups;

letting the first set of symbols of the selected group indicate one or more standards corresponding to the one or more of the wireless communication receivers to be woken up;

constructing a wake-up signal based on a sequence of symbols of the selected group; and transmitting the wake-up signal for reception by the wake-up radio unit, wherein each sequence in the collection of sequences is a code word of an error correcting block code.

16. An arrangement for a wireless communication device having a plurality of wireless communication receivers, the arrangement comprising a controller adapted to cause:

reception, by a wake-up radio unit, of a wake-up signal;

identification of a first set of symbols of the received wake-up signal;

selection of one or more wireless communication receivers adapted to receive in accordance with one or more corresponding standards indicated by the identified first set of symbols; and waking up of the selected one or more wireless communication receiver, wherein the wake-up signal is constructed by:

selecting a collection of sequences of symbols;

dividing the collection of sequences into a plurality of groups, wherein all sequences of a group comprise a same first set of symbols;

selecting one of the groups;

letting the first set of symbols of the selected group indicate one or more standards corresponding to the one or more of the wireless communication receivers to be woken up; and constructing the wake-up signal based on a sequence of symbols of the selected group, wherein each sequence in the collection of sequences is a code word of an error correcting block code.

* * * * *